United States Patent [19]

Rietveld et al.

[11] 4,353,112
[45] Oct. 5, 1982

[54] SWITCHED-MODE VOLTAGE CONVERTER

[75] Inventors: Jan J. Rietveld, Eindhoven, Netherlands; Alain Moreau, Puteaux, France

[73] Assignee: U.S. Philips Corporation, New York, N.Y.

[21] Appl. No.: 72,261

[22] Filed: Sep. 4, 1979

[30] Foreign Application Priority Data

Sep. 11, 1978 [NL] Netherlands .................. 7809226

[51] Int. Cl.³ ........................................ H02M 3/335
[52] U.S. Cl. ................................. 363/16; 323/299; 363/86; 363/97
[58] Field of Search ............... 307/150; 323/15, 17, 323/22 T, DIG. 1, 299, 301; 363/16, 20, 80, 86, 97, 143

[56] References Cited

U.S. PATENT DOCUMENTS

| | | | |
|---|---|---|---|
| 2,999,972 | 9/1961 | Stroman | 323/234 |
| 3,601,680 | 8/1971 | Beckwith | 363/16 |
| 3,603,863 | 9/1971 | Grossoehme | 363/16 |
| 3,737,758 | 6/1973 | Allington | 363/86 |
| 4,037,271 | 7/1977 | Keller | 363/80 X |
| 4,079,294 | 3/1978 | Teuling | 323/DIG. 1 |
| 4,087,850 | 5/1978 | Koizumi | 363/80 X |
| 4,104,714 | 8/1978 | Smith et al. | 363/80 X |

FOREIGN PATENT DOCUMENTS

| | | | |
|---|---|---|---|
| 2413173 | 10/1975 | Fed. Rep. of Germany | 323/22 T |
| 1524722 | 9/1978 | United Kingdom . | |

OTHER PUBLICATIONS

Dangschat et al., "Ein Sperrwandler-Netz Modul, Mit Netztrennung", Funkschau, vol. 47, No. 5, pp. 40–43, Feb. 28, 1975, S57430154e.

Primary Examiner—A. D. Pellinen
Attorney, Agent, or Firm—Robert T. Mayer; Bernard Franzblau

[57] ABSTRACT

A switched-mode converter produces a periodic square-wave signal whose amplitude depends on the input d.c. voltage. This signal is applied to an inductive network. A rectifier and a smoothing capacitor are coupled to this network with the output d.c. voltage being present across the capacitor. The frequency of the square-wave signal is controlled in dependence on the input voltage, namely so that it is directly proportional thereto or that the period decreases at a greater rate than the input voltage increases. A further control, for example, a series control, can be used to regulate the output voltage.

23 Claims, 7 Drawing Figures

SWITCHED-MODE VOLTAGE CONVERTER

The invention relates to a switched-mode converter for converting an input d.c. voltage into an output d.c. voltage and comprising a generator for applying a periodic square-wave signal, whose amplitude depends on the input voltage, to an inductive network to which a rectifier and a smoothing capacitor are and wherein in operation a smoothed voltage is present across the capacitor.

Such a voltage converter is known from French Patent Application 2,353,991. In this known circuit a pulse generator comprises a plurality of switches by means of which a square-wave signal is applied to the series arrangement of a choke coil, the primary winding of a transformer and a separation capacitor. The output d.c. voltage of the circuit is obtained by the rectification of the voltage present at the secondary side of the transformer. The output voltage is stabilized by means of a pulse duration modulation of the control pulses which bring the switches alternately into the conducting and into the cutoff state, the duration of these pulses depending on the output signal to be controlled. The choke stores energy during a portion of the period and transfers it in another portion, while voltage and current peaks are suppressed.

The above described control is rather expensive. It requires, in addition to the modulator, a comparison stage in which a voltage derived from the output signal is compared with a reference voltage while the edges of the pulses must be sufficiently steep so that the output voltage must be properly smoothed and measures must be taken against an unwanted high frequency radiation. Such a control is therefore economically justified only for apparatus in which a substantially constant supply voltage is essential and whose consumed power is rather high. This applies to, for example, nonportable large-screen colour television receivers.

The invention is based on the recognition that the prior art converter is also usable without pulse duration control provided a simple and, consequently, cheap control is used, which control considerably improves the efficiency. To this end the switched-mode converter according to the invention is characterized in that means are provided for controlling the frequency of the square-wave signal in dependence on the input d.c. voltage.

Such a control is a forward control and has therefore all the known advantages thereof, namely the fact that changes in the input voltage are passed on without appreciable delay and that the circuit is stable owing to the absence of feedback. This control can be of such a nature that the frequency of the square-wave signal is directly proportional to the input d.c. voltage or that the period of the square-wave signal decreases when the input d.c. voltage increases and decreases when the input voltage decreases, the relative variation of the period being greater than that of the input voltage.

In the latter case, the converter may be characterized in that a load is arranged in parallel with the smoothing capacitor so that the smoothed voltage is also the output voltage, and in that the current through the load is substantially constant.

In the first case and/or when the output current has a substantial variation, the converter according to the invention may be characterized in that a series control transistor is arranged between the smoothing capacitor and the load with the output voltage present across the load being kept substantially constant by means of the series control transistor. As the known converter has a low dissipation, such a combination thereof with a series control circuit can furnish an attractive solution for the supply of medium power apparatus, that is to say apparatus consuming between approximately 30 and 60 W, for example large-screen black-white television receivers and small colour television receivers. Owing to the dissipation in the series control transistor such a combination is not economically justified for higher powers.

In a preferred embodiment of the converter according to the invention the duty cycle, i.e. the ratio of the time interval in which the square-wave signal assumes a given value to the period, is substantially constant. The dissipation is still further reduced if said ratio is approximately equal to 0.5.

The square-wave signal can be produced by means of a sawtooth voltage and a threshold voltage, the sawtooth voltage being produced across a capacitor whose charging current originates from a current source and which is periodically discharged, the charging current flowing through a resistor connected to the input d.c. voltage and, in the above-mentioned second case, a substantially constant-voltage element, for example a Zener diode, being arranged in series with the resistor.

The invention will be further explained by way of non-limitative example with reference to the accompanying figures, wherein.

Figure 1:
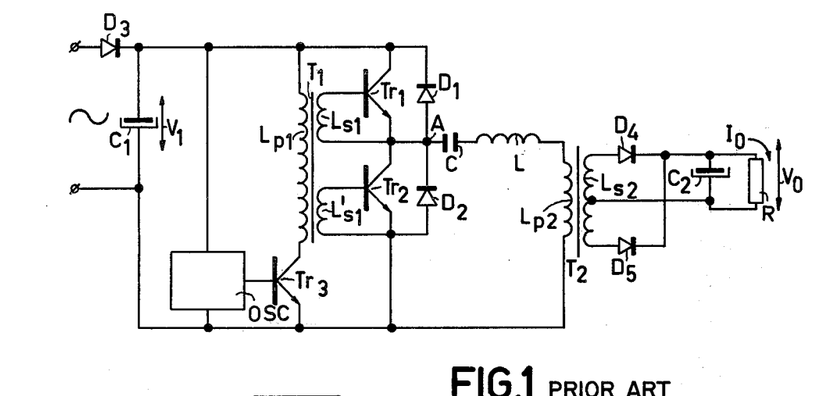
FIG. 1 shows the known converter but without control.

The circuit of FIG. 1 is of a known type. Two npn-switching transistors $Tr_1$ and $Tr_2$ are arranged in series between the terminals of a d.c. voltage source $V_1$. Diodes $D_1$ and $D_2$, respectively, are arranged in parallel with the collector-emitter path of each transistor $Tr_1$ and $Tr_2$, and with the opposite conductivity direction with respect to that of said transistors. The base of a driver transistor $Tr_3$, also of the npn-type, is supplied in operation with pulses produced by an oscillator OSC. Oscillator OSC as well as transistor $Tr_3$ are provided with supply energy by source $V_1$. The primary winding $L_{p1}$ of a driver transformer $T_1$ is included in the collector lead of transistor $Tr_3$. Secondary windings $L_{s1}$ and $L'_{s1}$ of transformer $T_1$ are respectively arranged between the base and the emitter of each of the transistors $Tr_1$ and $Tr_2$, the winding senses of said windings having been chosen so that transistor $Tr_1$ is alternately in the conducting and then the cutoff state while at the same time transistor $Tr_2$ is alternately in the cutoff and then the conducting state. Voltage $V_1$ is derived from the electric supply by means of a rectifier $D_3$ and a smoothing capacitor $C_1$.

The emitter of transistor $Tr_1$ and the collector of transistor $Tr_2$ are interconnected. Arranged between the junction A thus formed and the negative terminal of source $V_1$ is the series arrangement of an isolating capacitor C, an inductance L and the primary winding $L_{p2}$ of a transformer $T_2$. One end of a secondary winding $L_{s2}$ of transformer $T_2$ is connected to the anode of a rectifier $D_4$ whereas the other end of winding $L_{s2}$ is connected to the anode of a rectifier $D_5$. A smoothing capacitor $C_2$ and a load, which may be considered as a resistor R, are included between the interconnected cathodes of rectifiers $D_4$ and $D_5$ and the centre tap of winding $L_{s2}$. In operation, a d.c. voltage $V_0$ is present across capacitor $C_2$ and load R and a direct current $I_0$ flows through load R. The negative terminal of voltage source $V_0$ is connected to ground and can be connected to the negative terminal of source $V_1$. When not so connected transformer $T_2$ provides d.c. isolation between ground and the electric supply.

Figure 2:
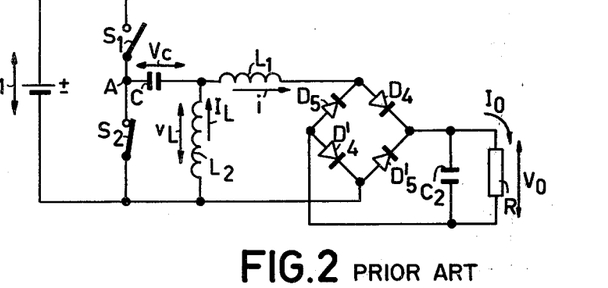
FIG. 2 shows an equivalent circuit thereof.

FIG. 2 shows an equivalent circuit of the circuit of FIG. 1. Herein elements $Tr_1$, $D_1$ and $Tr_2$, $D_2$ have been replaced by two ideal switches $S_1$ and $S_2$. By means thereof it is achieved that point A alternately assumes the potential O and the potential $V_1$. The capacitance of capacitor C is assumed to be infinitely large whereas transformer $T_2$ and inductance L are replaced by a parallel inductance $L_2$ having an infinitely high value and a finite series inductance $L_1$, allowance having been made in this inductance $L_1$ for the leakage inductance of transformer $T_2$. The symmetry at the secondary side of transformer $T_2$ is restored in the equivalent circuit of FIG. 2 by substituting a Graetz bridge rectifier circuit $D_4, D'_4, D_5, D'_5$ for the full-wave rectifier $D_4, D_5$.

Figure 3:
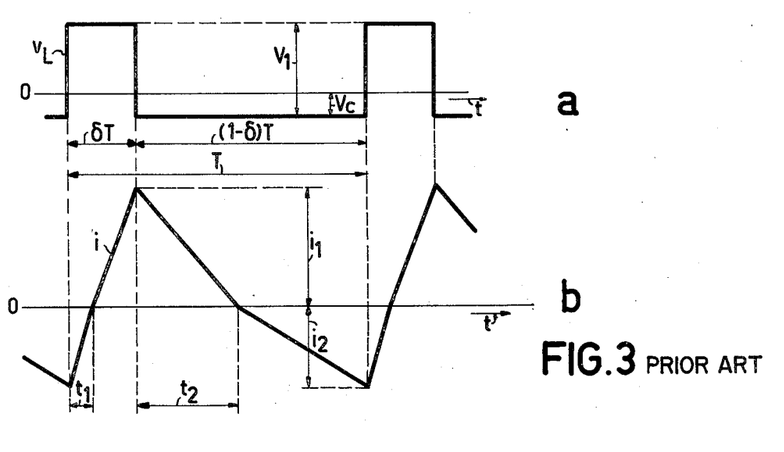
FIG. 3 shows waveforms occurring therein.

FIG. 3a shows schematically the variation as a function of time of the voltage $V_L$ across inductance $L_2$ in the steady state and FIG. 3b shows schematically the variation of the current i through inductance $L_1$ to the same time scale.

Transistor $Tr_1$ conducts during a portion $\delta T$ of the period T of the signal of oscillator OSC, whereas transistor $Tr_2$ conducts during the remaining portion $(1-\delta)T$ of period T. Across capacitor C there is a d.c. voltage $V_c$ the value of which can be determined by means of the condition that no d.c. voltage can exist across inductance $L_2$. Therefore it appears from FIG. 3a that $V_c = \delta V_1$. The variation of current i during one period T is represented by four joined straight lines, a time shift $t_1$ for the zero crossing of current i at the beginning of interval $\delta T$ and a time shift $t_2$ for the zero crossing of current i at the beginning of interval $(1-\delta)T$ occurring relative to voltage $V_L$. In these circumstances the variation of current i can be determined analytically and $t_1$ and $t_2$ can be calculated as a function of ratio $\delta$ and of voltages $V_1$ and $V_0$. It appears that both the interval $\delta T - t_1 + t_2$ during which rectifiers $D_4$ and $D'_4$ conduct and the interval $(1-\delta)T - t_2 + t_1$ during which rectifiers $D_5$ and $D'_5$ conduct are equal to half the period T.

A direct current $I_L$, which cannot flow through capacitor C but which can flow through inductance $L_2$ flows through inductance $L_1$. Current $I_L$ is equal to the mean value of current i in FIG. 3b.

We find that:

$$I_L = \frac{V_o T}{4L_1}(1-2\delta) \quad (1)$$

wherein $L_1$ represents the value of inductance $L_1$ in FIG. 2.

Current $I_0$ is equal to the mean value of the result of the rectification of current i in FIG. 3b.

We find that:

$$I_o = \frac{V_1 T}{4L_1}\left[\delta - \delta^2 - \left(\frac{V_o}{V_1}\right)^2\right] \quad (2)$$

From relation (1) it appears that current $I_L$ becomes zero is $\delta = 0.5$. In that case no direct current flows through winding $L_{p2}$ in FIG. 1 so that the losses in transformer $T_2$ are minimal. The expression (2) for current $I_0$ varies little when ratio $\delta$ assumes values between 0.3 and 0.7, that is to say the duty cycle of transistors $Tr_1$ and $Tr_2$, respectively, has only a limited effect on output current $I_0$ in a wide range around the value which corresponds to the symmetrical drive of the transistors. Therefore the behaviour of the circuit can be considered with a proper approximation for the value $\delta = 0.5$. It appears that for $\delta = 0.5$ the maximum value $i_1$ of the current through rectifiers $D_4$ and $D'_4$ (see FIG. 3b) is equal to the maximum value $i_2$ of the current through rectifiers $D_5$ and $D'_5$. In the period of time $\delta T - t_1$ current i flows through transistor $Tr_1$, in the period of time $t_2$ it flows through diode $D_2$, in the period of time $(1-\delta)T - t_2$ it flows through transistor $Tr_2$ and in the period of time $t_1$ it flows through diode $D_1$.

Current $I_0$ is a square function of voltage $V_0$. This function is simplified as follows for $\delta = 0.5$:

$$I_o = \frac{V_1 T}{4L_1}\left[\tfrac{1}{4} - \left(\frac{V_o}{V_1}\right)^2\right] \quad (3)$$

Figure 4:
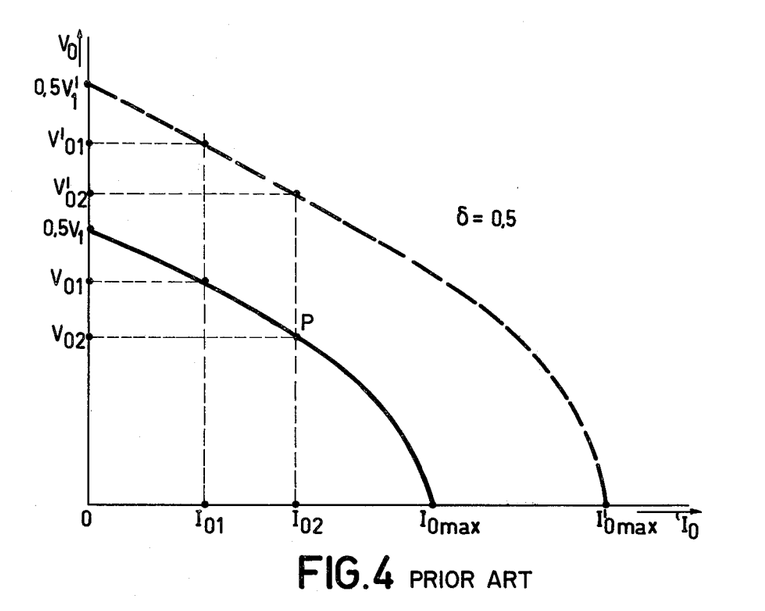
FIG. 4 shows the output characteristic thereof.

Function (3) is plotted in FIG. 4, in which FIG. $I_0$ varies along the horizontal axis of the system of coordinates, whereas $V_0$ varies along the vertical axis. The curve obtained is a parabola whose symmetry axis coincides with the horizontal axis. Without the load it holds that $I_0 = 0$ so that $V_o = 0.5 V_1$ whereas voltage $V_0$ becomes zero for $$I_{omax} = \frac{V_1 T}{16 L_1} \quad (4)$$

which is the value of the short circuit current.

FIG. 4 shows that the output voltage is subjected to a variation from a value $V_{01}$ to a value $V_{02}$ when the output current varies between a value $I_{01}$ and a value $I_{02}$ at an input voltage which has remained constant. From equation (3) it can be derived that the internal resistance of the circuit is equal to $$\frac{2V_1 L_1}{V_o T}$$

This shows that the internal resistance increases with an increasing $I_0$ and becomes infinitely large for a short-circuited output. It will be clear that similar results will also be obtained for other values of ratio $\delta$.

The broken line parabolic curve in FIG. 4 shows the variation of voltage $V_0$ for a value $V'_1$ of voltage $V_1$ which is higher than the value considered above. If the input voltage varies between the values $V_1$ and $V'_1$, FIG. 4 shows that the output voltage varies between the values $V'_{01}$ and $V'_{02}$ at a varying output current. For many applications such a variation is impermissible, so that stabilisation is required.

Figure 5:
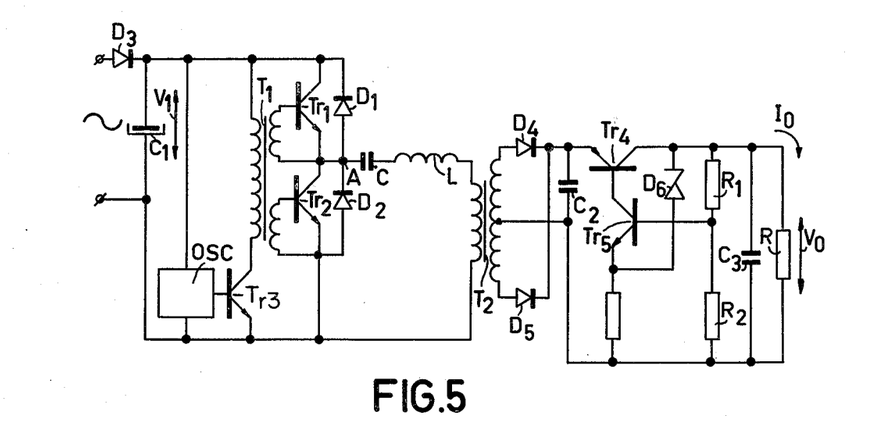
FIG. 5 shows the combination of the known converter with a series control circuit.

FIG. 5 shows the converter of FIG. 1, the same reference symbols having been used for the same elements, in combination with a stabilisation circuit. A series transistor $Tr_4$ of the pnp type, whose internal resistance is controlled in known manner in dependence on the voltage $V_0$ across the load, is included between capacitor $C_2$ and load R. To this end a npn transistor $Tr_5$ compare a voltage derived from voltage $V_0$ by means of a resistance voltage divider $R_1$, $R_2$ with the reference voltage of a zener diode $D_6$. The collector current of transistor $Tr_5$, which is at the same time the base current of transistor $Tr_4$, depends on the difference between the compared voltages. A smoothing capacitor $C_3$ is arranged in parallel with load R and in the same circumstances as in FIG. 1 substantially the same current $I_0$ flows through load R as it does in FIG. 1.

In the theoretic case that all elements are ideal and that the ratio $\delta = 0.5$, the circuit in FIG. 1, the load excepted, does not dissipate power. If the series regulation in FIG. 5 is used a loss does occur, namely mainly the dissipation caused by the voltage drop across transistor $Tr_4$. This dissipation can be kept at a minimum if in FIG. 4 the output characteristic is chosen which passes through the point P, for which it holds that $I_0 = I_{02}$ and $V_0 = V_{02}$, $V_{02}$ being the value of the substantially constant output voltage, whereas $I_{02}$ is the highest output current to be expected. At this point said dissipation is zero. The dissipation is not zero at a constant input voltage $V_1$ for other values of the output current and, particularly, for the lowest output current $I_{01}$ to be expected, for which the output voltage still has the value $V_{02}$, whereas the voltage across capacitor $C_2$ in FIG. 5 is equal to $V_{01}$. If the input voltage of the value $V_1$ increases to $V'_1$, the voltage drop across transistor $Tr_4$ for the case $I_0 = I_{02}$ is equal to $V'_{02} - V_{02}$ and for $I_0 = I_{01}$, this voltage drop is equal to $V'_{01} - V_{02}$. The dissipation can therefore be considerable.

The foregoing can be explained with reference to a numerical example. Let us assume that a constant output voltage 25 V is desired at an output current varying between 0.8 and 1.2 A, that is to say a useful power $W_0$ from 20 to 30 W. The input voltage $V_1$ varies from 230 to 345 V. We choose $\delta = 0.5$ and a primary current of $I_{02} = 0.5 I_{0\ max}$ for $V_1 = 230$ V. It follows from expressions (3) and (4) that the voltage at the primary side of transformers $T_2$:
$V_{02} = 0.353 \times V_1 = 8.12$ V and that $I_{0\ max} = 2 I_{02} = 2W_0/V_{02} = 0.74$ A so that $I_{02} = 0.37$ A. Consequently, the transformation ratio of transformer $T_2$ is $0.37/1.2 = 0.31$. Choosing $L_1 = 0.9$ mH, it is obtained that $$T = \frac{16 I_{omax} L_1}{V_1} = 46.2 \; \mu s,$$

which corresponds to a frequency of 21.65 kHz.

If now the output current assumes the value 0.8 A, the primary current $I_{01} = 0.8 \times 0.31 = 0.25$ A. On the basis of the parabola of FIG. 4 it is obtained that $V_{01} = 93.9$ V. So the dissipation in the circuits is $(0.25 \times 93.9) - 20 = 3.5$ W.

The following results are found for the parabolic characteristic shown in FIG. 4 by means of the broken line: $I'_{0\ max} = 0.74 \times 345/230 = 1.11$ A, $V'_{02} = 140.9$ V and $V'_{01} = 152.1$ V. In the first case the dissipation in the circuit is $(140.9 \times 0.74) - 30 = 22.1$ W, in the second case $(152.1 \times 0.25) - 20 = 18$ W. It is clear from the foregoing that the efficiency of the circuit is poor. In addition, the short-circuit current $I_{0\ max}$ increases with an increasing input voltage, which makes heavy demands on transistors $Tr_1$ and $Tr_2$.

It was tacitly assumed in the foregoing that the frequency of the switching signal is constant and, consequently, independent of the input voltage. The invention is based on the recognition that the efficiency can be considerably improved by the use of a forward control of the frequency such that the frequency varies in dependence on the input voltage.

Figure 6:
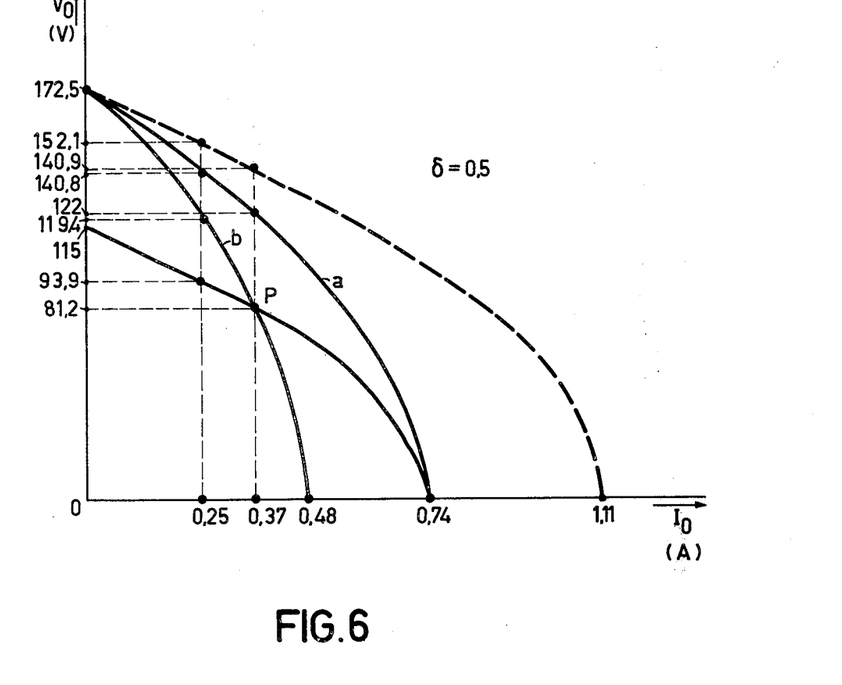
FIG. 6 shows output characteristics of the converter according to the invention.

FIG. 6 shows the characteristic of FIG. 4, but now includes values based on the above numerical example. FIG. 6 also shows the curve a which is obtained for a constant product $V_1 T$ of the input voltage $V_1$ by the period T of the switching signal. It appears from formula (4) that the short-circuit current remains constant, whereas the output voltage in the unloaded condition keeps the value $0.5 \; V'_1$ for an input voltage of $V'_1$. FIG. 6 shows that the values of the output voltage for curve a are always below those for the broken line curve. So such a control achieves a constant short-circuit current, which provides circuit protection and is advantageous for transistors $Tr_1$ and $Tr_2$, and a decrease of the dissipation. Using the above example it holds that:

$$T = \frac{46.2 \times 230}{345} = 30.8 \; \mu s,$$

which corresponds to a frequency of 32.47 KHz. For $I_{02}$ it is found that $V_0 = 122$ V, which produces in the circuit a dissipation of 15.1 W instead of 22.1 W for the broken line curve, and for $I_{01}$ it is found that $V_0 = 140.8$ V, causing in the circuit a dissipation of 14.7 W instead of 18 W.

An oscillator generating a signal whose period is inversely proportional to the input voltage and which is therefore suitable to control transistor $Tr_3$ can be implemented at the following simple manner. A capacitor is charged by a current source, the current being directly derived from voltage $V_1$. The voltage increases linearly across the capacitor. As soon as this voltage reaches a predetermined value the capacitor is quickly discharged. Thus, a sawtooth voltage is generated whose slope during the rising edge is proportional to voltage $V_1$. If voltage $V_1$ is multiplied by a certain factor, the charging time of the capacitor is divided by the same factor. So the product $V_1 T$ is constant and the frequency $f = 1/T$ is proportional to voltage $V_1$. Oscillators operating on this principle are known from the literature. The produced sawtooth signal is thereafter converted in known manner into a square-wave signal.

A further improvement with respect to the broken line curve of FIG. 6 is obtained by means of a circuit whose output characteristic is represented by curve b. In this circuit the frequency of the switching signal varies in such a manner that curve b passes through point P. As the points of curve b must satisfy the expression (3), this curve is a parabola intersecting the vertical axis at the same point as the broken line parabola and curve a. From this it appears that the short circuit current $I_{0\ max}$ decreases versus an increasing input voltage and that the dissipation in the series control circuit is still further decreased relative to the case of curve a. In the above-mentioned embodiment it was found that $I_{0\ max}$ for $V_1 = 345$ V is equal to $$\frac{0.37}{1-4\left(\frac{81.2}{345}\right)^2} = 0.48 \, A$$

from which it follows that $$V_{o1} = \frac{345}{2}\sqrt{1 - \frac{0.25}{0.48}} = 119.4 \, V,$$

corresponding to a dissipation of only 9.5 W, whereas the minimum dissipation, which is at point P, is zero.

In this circuit all characteristics intersect at the point P. If the current $I_0$ flowing to the load does not vary, no stabilisation is required at all, and the load can be connected directly in parallel with capacitor $C_2$. If this current varies somewhat it is, for example, possible to use a shunt control of a known type, e.g. a transistor in parallel with a resistor R and controlled so that the sum of the current therethrough and of the current through R remains constant. For a variation in voltage $V_1$, the operating point remains at point P. Now resistor R and the shunt transistor together constitute the load of the converter.

It further appears from FIG. 6 that the output voltage for point P does not contain a ripple voltage coming from the AC supply voltage. For a not too large variation of current $I_0$ the ripple voltage at the output is greatly attenuated compared to the cases of the broken line curve and curve a. By means of a shunt control it can be still further reduced. Capacitor $C_2$, and also capacitor $C_3$ for the case where a series arrangement is used, may therefore be of a low capacitance since only components of the switching frequency and harmonics thereof need be eliminated.

The variation in the frequency follows from the expression (3). It is found that: $T = 19.8 \, \mu s$, so that $f = 50.5$ kHz. The product $V_1 T$ varies between $230 \times 46.2 = 10^{-3} \times 10.6$ and $345 \times 19.8 = 6.8 \times 10^{-3}$. For the known circuit this product increases when the input voltage increases, whereas it remains constant in the case a. In the case b it decreases. From the numbers found it appears that the relative variation of T is approximately $-57\%$, whereas that of $V_1$ is approximately $33\%$, or, to put it into words: the period decreases at a greater rate than the input voltage increases. If, on the contrary, voltage $V_1$ decreases from a certain value, the product $V_1 T$ increases and period T also increases, namely by a greater relative variation than that of $V_1$.

Figure 7:
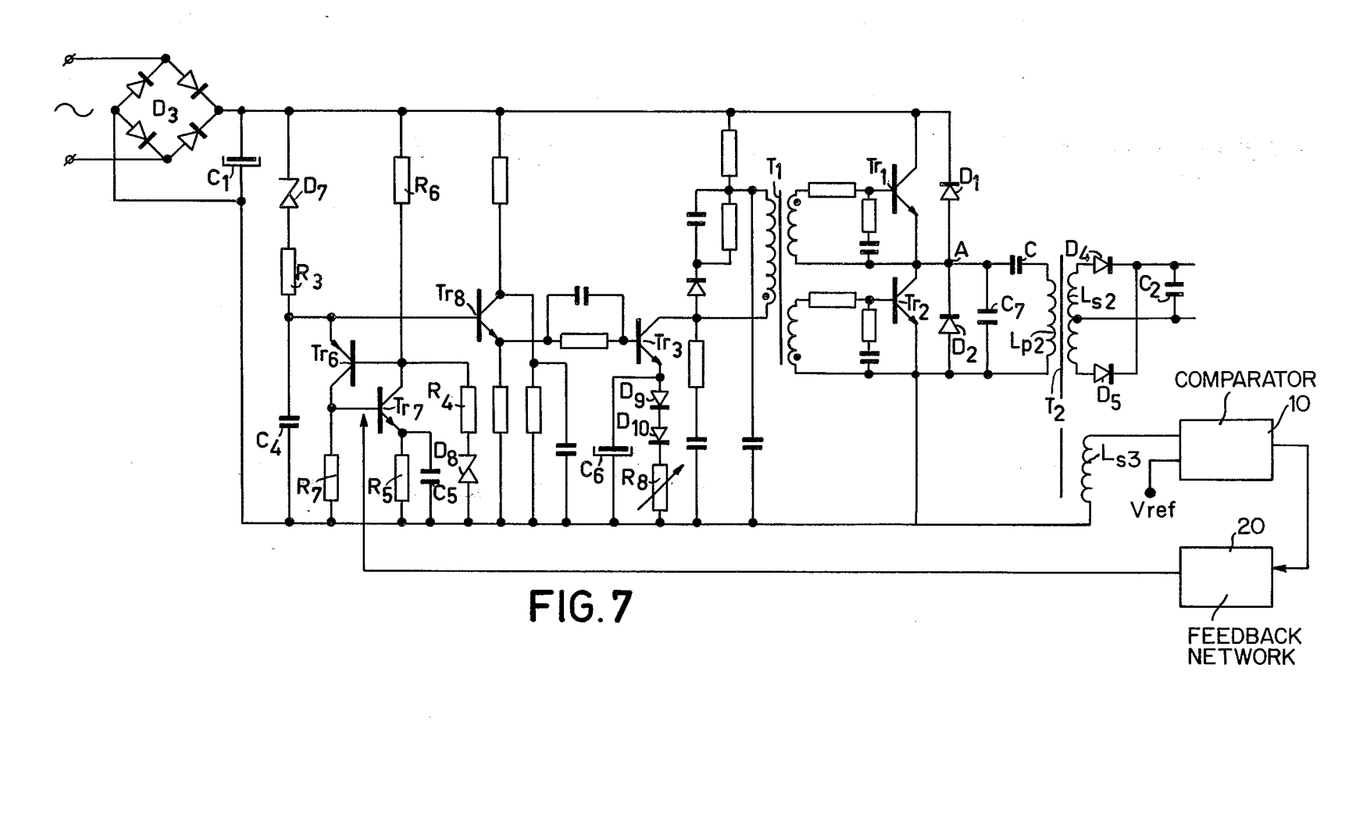
FIG. 7 shows an embodiment of the converter according to the invention.

FIG. 7 shows a complete circuit wherein elements corresponding to those in FIGS. 1 and 5 have been given the same reference numerals and wherein the oscillator satisfies the above conditions. A capacitor $C_4$ is charged by a current flowing through the series arrangement of a Zener diode $D_7$ and a high-value resistor $R_3$, connected to voltage $V_1$. Resistor $R_3$ may be considered as a current source. A switch, constructed in known manner by means of two complementary transistors $Tr_6$ and $Tr_7$, is arranged to operate as a thyristor. The thyristor is rendered conductive when the voltage across capacitor $C_4$ reaches approximately the substantially constant value of voltage across the series arrangement of a resistor $R_4$ and a Zener diode $D_8$ and serves as the discharging element for capacitor $C_4$. The anode gate of thyristor $Tr_6$, $Tr_7$ is connected to voltage $V_1$ through a resistor $R_6$ whereas the cathode gate is connected to the negative terminal of source $V_1$ through a resistor $R_7$. The discharge stops when the voltage across capacitor $C_4$ has been reduced to approximately the substantially constant value of the voltage across an RC parallel network $R_5$, $C_5$ situated in the cathode lead of the thyristor.

A substantially constant voltage which is subtracted from voltage $V_1$ is present across diode $D_7$, which could be replaced by a voltage dependent resistor. The voltage drop across resistor $R_3$ and, consequently, also the charging current of capacitor $C_4$, flowing therethrough, is subjected to a relative variation which is greater than would be the case if diode $D_7$ were absent. The relative variation of the period of the sawtooth voltage having a constant amplitude, produced across capacitor $C_4$, is therefore greater than that of voltage $V_1$. The discharging time of capacitor $C_4$ is very short as the discharge current flows through the emitter of transistor $Tr_6$, this being a low-ohmic path. By means of a suitable choice of elements $D_7$, $R_3$ and $C_4$ it is possible to obtain the desired variation of period T as a function of voltage $V_1$. The following values were opted for in the above mentioned example: $R_3 = 100 \, k\Omega$, $C_4 = 10 \, nF$, the voltage across diode $D_7$ being approximately 145 V. It will be noted that the described sawtooth oscillator can also be used in the case of curve a in FIG. 6, provided that diode $D_7$ is replaced by a short-circuit.

Through an emitter follower transistor $Tr_8$, which serves as a separating stage, the sawtooth voltage present across capacitor $C_4$ is applied to the base of driver transistor $Tr_3$ which converts the sawtooth into a square-wave. To this end the series arrangement of a number of diodes, for example two diodes $D_9$ and $D_{10}$, and a resistor $R_8$, which series arrangement is shunted by a decoupling capacitor $C_6$, is included in the emitter lead of transistor $Tr_3$. A substantially constant threshold voltage is present at the emitter. Transistor $Tr_3$ is brought to the saturation state as soon as its base voltage becomes somewhat higher than this threshold voltage. Resistor $R_8$ is adjustable so that the ratio $\delta$ can be adjusted to a particular value with this resistor.

The square-wave signal thus obtained is applied to the bases of transistors $Tr_1$ and $Tr_2$ via transformer $T_1$. Transistor $Tr_1$ is cutoff, whereas transistor $Tr_2$ conducts in the interval in which transistor $Tr_3$ conducts. Attenuation networks are provided at the primary as well as at the secondary side of transformer $T_1$. A capacitor $C_7$ is arranged parallel with diode $D_2$, causing the slope of the voltage at point A to be reduced during the transitions, so that switching losses are somewhat reduced. Inductance L is constituted by the leakage inductance of transformer $T_2$. In the foregoing the capacitance of capacitor C was assumed to be very high. In practice, a value will be chosen for this capacitance such that the series network C, L has an inductive impedance in all circumstances, which means that the series resonance of the said network is below the minimum switching frequency, that is the frequency corresponding to the minimum input voltage. The following values were chosen for the above-mentioned construction of the circuit: $C = 1 \, \mu F$ and $C_7 = 1.5 \, nF$.

In the described constructions no feedback is used, except in the series control circuit including transistor $Tr_4$. It will be clear that this series regulation can be dispensed with if a feedback from, for example, the voltage across capacitor $C_2$ is used, which feedback is combined with the described forward control for obtaining an output characteristic which, at least between the values $I_{01}$ and $I_{02}$ of the output current is more horizontal than the parabola's considered above. The feedback furnishes, for example, an oscillator frequency variation which depends on the voltage across capacitor $C_2$. In this last-mentioned case the voltage present across a secondary winding $L_{s3}$ which is tightly coupled to winding $L_{s2}$ is, for example compared in a comparator 10 with a reference voltage, $V_{ref}$. Information which depends on the measured difference between the said voltages, may be used to control a transistor representing a variable resistor and included between the collector of transistor $Tr_7$ and the negative terminal of voltage source $V_1$. This influences the frequency of the switching signal. Alternatively, it is possible to exercise a triggering action via a feedback network 20 on one of the gate electrodes of thyristor $Tr_6$, $Tr_7$. Because the forward control is inertialess, the frequency immediately attains the value determined by the input voltage. The backward control is actuated somewhat later and readjusts the frequency. This consequently does not require a very complicated circuit and the loop gain need not be too high, which is a further advantage since too high a loop gain might produce instability.

What is claimed is:

1. A switched-mode converter for converting an input DC voltage into an output DC voltage comprising, an input terminal for connection to a source of input DC voltage, an inductive network, a signal generator coupled to the input terminal and arranged to apply to said inductive network a periodic square-wave signal of substantially constant duty cycle whose amplitude depends on the input voltage, a rectifier, a smoothing capacitor, means coupling the rectifier and capacitor to the inductive network so that a smoothed voltage is present across the capacitor, an output terminal for said DC output voltage coupled to said capacitor, and means responsive to the input DC voltage at the input terminal for controlling the frequency of the generated square-wave signal in dependence on the input DC voltage so that the product of the input DC voltage and the period T of the square-wave signal exhibits a predetermined characteristic relative to a variation of the input DC voltage at said input terminal.

2. A converter as claimed in claim 1 wherein the frequency controlling means causes the frequency of the square-wave signal to be directly proportional to the input d.c. voltage.

3. A converter as claimed in claim 2 wherein said frequency controlling means is arranged to maintain the product of the input DC voltage and the period T constant so that the value of a short-circuit current across the smoothing capacitor is independent of the input DC voltage.

4. A converter as claimed in claim 1 wherein said frequency controlling means is arranged so that the period of the square-wave signal decreases when the input d.c. voltage increase and increases when the input voltage decreases, the relative variation of the period being greater than that of the input voltage.

5. A converter as claimed in claim 4, characterized in that the value of a short-circuit current across the smoothing capacitor decreases when the input voltage increases, and increases when the input voltage decreases.

6. A converter as claimed in claim 4 wherein a load is connected in parallel with the smoothing capacitor so that the smoothed voltage of the capacitor is also the output voltage, and wherein the current through the load remains substantially constant.

7. A converter as claimed in claim 2 or 4 further comprising a series control transistor coupled between the smoothing capacitor and a load connected to the output terminal, the output voltage being present across the load and being kept substantially constant by means of the series control transistor.

8. A converter as claimed in claim 1, 2 or 4 wherein the duty cycle is approximately equal to 0.5.

9. A converter as claimed in claim 1, 2, 3, 4 or 5 wherein the square-wave signal generator comprises, a sawtooth voltage generator including a capacitor and a resistor, the sawtooth voltage being produced across said capacitor by means of a charging current that originates from a current source and flows through the resistor which is connected to the input terminal, means for periodically discharging the capacitor, and a switching transistor having a threshold voltage and responsive to the sawtooth voltage to derive the square-wave signal.

10. A converter as claimed in claim 9 wherein the sawtooth generator derives a sawtooth voltage having a constant amplitude and the duty cycle of the square-wave signal is substantially constant.

11. A converter as claimed in claim 1 wherein the frequency controlling means derives a said predetermined characteristic wherein the product of the DC input voltage and the period T of the square-wave signal decreases as the input voltage increases.

12. A converter as claimed in claim 1, 2, 3, 4 or 11 wherein said inductive network includes at least one capacitor and at least one inductor arranged to form a non-resonant circuit having a net inductive characteristic within the range of operational frequencies of the square-wave signal generator.

13. A converter as claimed in claim 1 wherein a load is coupled to the output terminal and in parallel with the smoothing capacitor so that the smoothed capacitor voltage is also the output voltage, and means further controlling the frequency of the square-wave signal in dependence on the output voltage.

14. A converter as claimed in claims 1, 2, 3 or 4 wherein said inductive network includes inductance means and capacitance means in series circuit and with the series resonant frequency of the series circuit being lower than the lowest operational frequency of the square-wave signal.

15. A switched-mode converter comprising, an input terminal for receiving a DC input voltage, a square-wave signal generator coupled to said input terminal and including means for controlling the frequency of the generated square-wave signal as a function of the input DC voltage to provide a given voltage vs. frequency characteristic in which the product of the input DC voltage and the period T of the square-wave signal is constant, an output terminal for supplying a DC output voltage derived in said converter, a rectifier and a first capacitor coupled to said output terminal to supply thereto said DC output voltage, and a coupling network including a second capacitor and a transformer which couple an output of the signal generator to said rectifier and first capacitor.

16. A switched-mode converter comprising, an input terminal for receiving a DC input voltage, a square-wave signal generator coupled to said input terminal and including means for controlling the frequency of the generated square-wave signal as a function of the input DC voltage to provide a given voltage vs. frequency characteristic, the frequency controlling means controlling the signal generator so that the period of the square-wave signal decreases for an increase of the input DC voltage and vice versa and with a relative variation thereof so as to derive a said given characteristic wherein the product of the input DC votlage and the period T of the square-wave signal decreases for an increase in the input DC voltage, an output terminal for supplying a DC output voltage derived in said converter, a rectifier and a first capacitor coupled to said output terminal to supply thereto said DC output voltage, and a coupling network including a second capacitor and a transformer which couple an output of the signal generator to said rectifier and first capacitor.

17. A converter is claimed in claims 15 or 16 wherein the signal generator includes means for generating a square-wave signal having a substantially constant duty cycle.

18. A converter as claimed in claims 15 or 16 wherein the signal generator includes means for generating a square-wave signal having a substantially constant duty cycle equal to 0.5.

19. A converter as claimed in claims 15 or 16 wherein the elements of said coupling network are chosen so that the network forms a non-resonant circuit having a net inductive characteristic over the range of operational frequencies of the square-wave signal generator.

20. A switched-mode converter comprising, an input terminal for receiving a DC input voltage, a square-wave signal generator coupled to said input terminal and including means for controlling the frequency of the generated square-wave signal as a function of the input DC voltage to provide a given voltage vs. frequency characteristic, the square-wave signal generator comprising, a sawtooth signal generator including a capacitor and resistor forming a timing circuit coupled to the input terminal, a current source coupled to the timing circuit to charge the capacitor, means for periodically discharging the capacitor, and a switching transistor having a threshold voltage and responsive to the sawtooth signal to derive said square-wave signal, an output terminal for supplying a DC output voltage derived in said converter, a rectifier and a first capacitor coupled to said output terminal to supply thereto said DC output voltage, and a coupling network including a second capacitor and a transformer which couple an output of the signal generator to said rectifier and first capacitor.

21. A switched-mode converter for converting an input DC voltage into an output DC voltage comprising, an input terminal for connection to a source of input DC voltage, an inductive network, a signal generator coupled to the input terminal and arranged to apply to said inductive network a periodic square-wave signal of substantially constant duty cycle whose amplitude depends on the input voltage, said square-wave generator comprising, a sawtooth voltage generator including a capacitor and a resistor with the sawtooth voltage being produced across said capacitor by means of a charging current that originates from a current source and flows through the resistor which is connected to the input terminal, a substantially constant voltage element connected in series with the resistor, means for periodically discharging the capacitor, and a switching transistor having a threshold voltage and responsive to the sawtooth voltage to derive the square-wave signal, a rectifier, a smoothing capacitor, means coupling the rectifier and capacitor to the inductive network so that a smoothed voltage is present across the capacitor, an output terminal for said DC output voltage coupled to said capacitor, and means responsive to the input DC voltage at the input terminal for controlling the frequency of the generated square-wave signal in dependence on the input DC voltage so that the product of the input DC voltage and the period T of the square-wave signal exhibits a predetermined characteristic relative to a variation of the input DC voltage at said input terminal, said frequency controlling means being arranged so that the period of the square-wave signal decreases when the input DC voltage increases and increases when the DC voltage decreases, the relative variation of the period being greater than that of the input voltage.

22. A switched-mode converter comprising, an input terminal for receiving a DC input voltage, a square-wave signal generator coupled to said input terminal and including means for generating a square-wave signal having a substantially constant duty cycle and means for controlling the frequency of the generated square-wave signal as a function of the input DC voltage to provide a given voltage vs. frequency characteristic, an output terminal for supplying a DC output voltage derived in said converter, a rectifier and a first capacitor coupled to said output terminal to supply thereto said DC output voltage, and a coupling network including a second capacitor and a transformer which couple an output of the signal generator to said rectifier and first capacitor.

23. A switched-mode converter comprising, an input terminal for receiving a DC input voltage, a square-wave signal generator coupled to said input terminal and including means for generating a square-wave signal having a substantially constant duty cycle equal to 0.5 and means for controlling the frequency of the generated square-wave signal as a function of the input DC voltage to provide a given voltage vs. frequency characteristic, an output terminal for supplying a DC output voltage derived in said converter, a rectifier and a first capacitor coupled to said output terminal to supply thereto said DC output voltage, and a coupling network including a second capacitor and a transformer which couple an output of the signal generator to said rectifier and first capacitor.

* * * * *

UNITED STATES PATENT AND TRADEMARK OFFICE
CERTIFICATE OF CORRECTION

PATENT NO. : 4,353,112

DATED : October 5, 1982

INVENTOR(S) : JAN J. RIETVELD ET AL

It is certified that error appears in the above-identified patent and that said Letters Patent is hereby corrected as shown below:

Column 1, line 9, after "are" insert --coupled--

Claim 4, line 4, change "increase" to --increases-- (first occurrence)

Claim 8, line 1, change "claim" to --claims--

Claim 9, line 1, change "claim" to --claims--

Claim 12, line 1, change "claim" to --claims--

Signed and Sealed this

Thirtieth Day of July 1985

[SEAL]

Attest:

DONALD J. QUIGG

*Attesting Officer*     *Acting Commissioner of Patents and Trademarks*